United States Patent [19]

Caliva

[11] 4,061,083
[45] Dec. 6, 1977

[54] AUTOMATIC FOOD ROASTING AND BASTING DEVICE

[76] Inventor: John Caliva, 9250 Sepulveda Blvd., Sepulveda, Calif. 91343

[21] Appl. No.: 611,315

[22] Filed: Sept. 8, 1975

[51] Int. Cl.² ............................................. A47J 37/04
[52] U.S. Cl. ................................. 99/345; 99/421 H; 118/24; 222/169; 426/523
[58] Field of Search ...................... 99/345, 421 H, 346, 99/347, 323.18, 494, 355, 516, 534, 535, 536; 222/144.5, 167, 169, 170, 565, 485; 118/31, 24, 25; 426/523, 302, 296; 239/141

[56] References Cited

U.S. PATENT DOCUMENTS

| | | | |
|---|---|---|---|
| 835,379 | 11/1906 | Tedford | 222/169 |
| 991,790 | 5/1911 | Lampke | 222/169 |
| 2,083,147 | 6/1937 | Clarkson | 99/345 |
| 2,796,019 | 6/1957 | Vaughn | 99/346 |
| 2,861,719 | 11/1958 | Trotter | 222/169 |
| 3,022,721 | 2/1962 | Vath | 99/345 |
| 3,132,949 | 5/1964 | Crowe | 99/353 X |
| 3,180,248 | 4/1965 | Mell | 99/421 |
| 3,224,362 | 12/1965 | Kozar | 99/346 |
| 3,295,721 | 1/1967 | Hibbard et al. | 222/169 |
| 3,643,838 | 2/1972 | Allen | 222/169 |
| 3,935,807 | 2/1976 | Main | 99/352 |

*Primary Examiner*—Billy J. Wilhite
*Attorney, Agent, or Firm*—John J. Posta, Jr.

[57] ABSTRACT

The improved food roasting and basting device of the present invention includes a fire box with spit spaced above it and a basting unit spaced above the spit. The non-clogging basting unit includes a hollow, preferably elongated and cylindrical container with spaced aperture extending therethrough and means, such as a motor, for rotation of the container around an axis generally parallel to the spit. The spit can also be rotated, if desired, and a separate motor can be used, or a belt and pulley assembly can be employed, to rotate both the spit and basting container at the same or different speeds. The apertures in the basting container can be arranged in a spiral pattern and can be partially or fully closed, and the container can be divided internally into separate compartments for dispensing separate basting materials.

6 Claims, 6 Drawing Figures

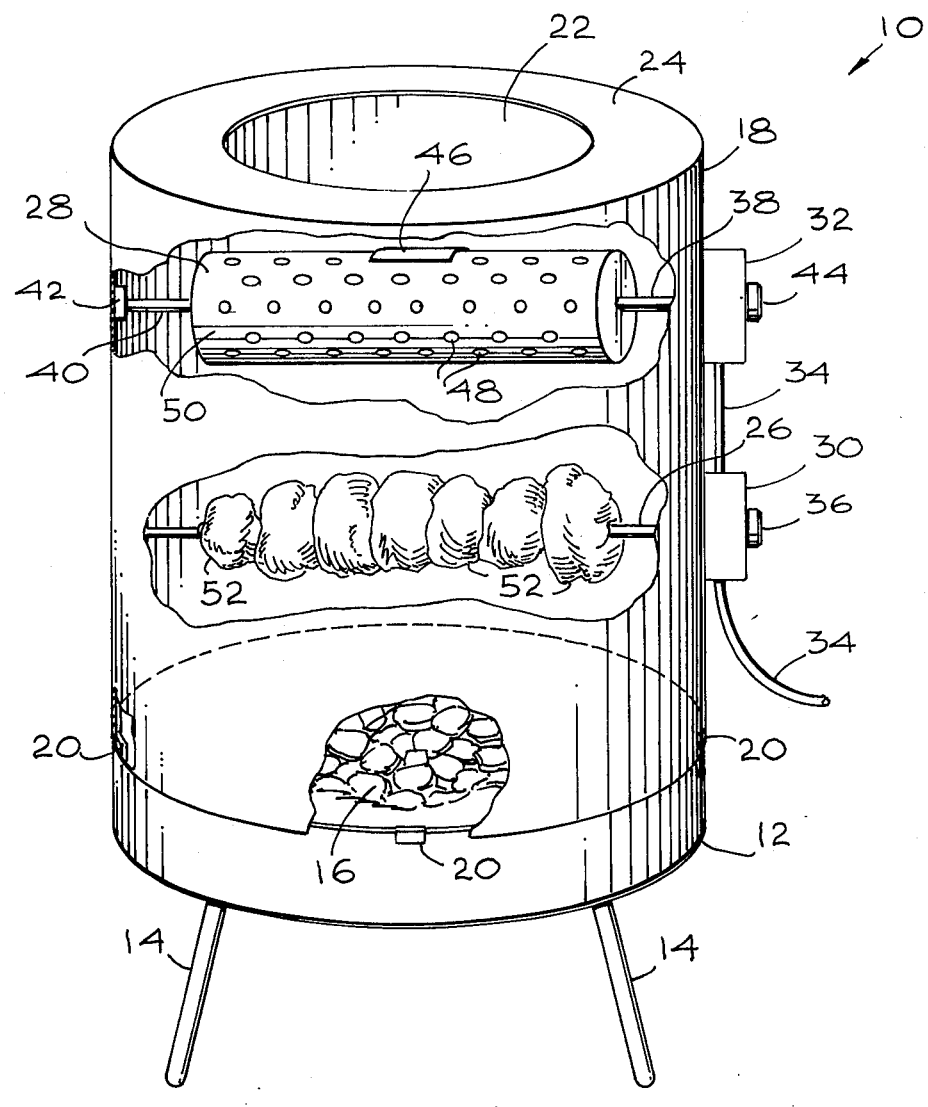
Fig. 1
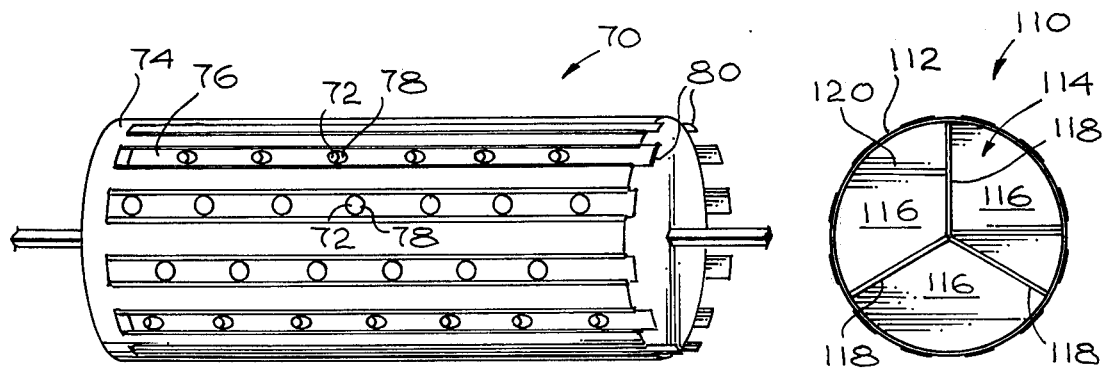
Fig. 3
Fig. 6

AUTOMATIC FOOD ROASTING AND BASTING DEVICE

BACKGROUND OF THE INVENTION

A. Field of the Invention

The present invention generally relates to cooking means and more particularly to roasting and basting devices.

B. Description of Prior Art

Conventional food roasting devices include, among others, those with roasting spits supported above a fire box or fire tray within which fuel, usually in the form of charcoal briquettes or the like, is disposed. Some of such devices include a moveable stand upon which the fire tray is disposed, and may also include a hood over the tray. In some instances the spit is rotatable by a motor connected to the hood.

In a few instances, a fixed basting tray or pipe may be provided above the spit to distribute basting liquid over the surface of the item being roasted on the spit. Such basting tray or pipe usually has a plurality of spaced apertures through which basting liquid can pass down to the roasting item. However, such trays and pipes do not provide sufficient control over the distribution of the basting liquid, even if the roasting item is turning on the spit, to provide a uniformly satisfactorily basted product, regardless of the item basted. Moreover, their stationary apertures tend to clog over a period of time so that the basting becomes particularly non-uniform and unsatisfactory. In addition, during the basting, the ingredients of the basting liquid may become sufficiently separated so that non-uniformity of basting will be accentuated. Even rather expensive basting units do not overcome these problems.

Accordingly, there is a need for an improved inexpensive, easily operated food roasting and basting device which will not clog up and will provide better and finer control over the basting operation, allowing the rate of delivery, location and content of the basting liquid, powder or the like to be more closely regulated, so as to produce the best possible results, regardless of the item or items being basted.

SUMMARY OF THE INVENTION

The foregoing needs are satisfied by the improved automatic food roasting and basting device of the present invention. The device is substantially as set forth in the Abstract above. In this regard, an elongated rotatable, hollow basting container is provided, which has a plurality of spaced apertures, preferably the size of which can be regulated by variable closure means. The aperture may be in a spiral pattern for maximum efficiency. The container may also have its interior subdivided into separate compartments so that separate basting ingredients can be separately delivered to the item roasting on the spit, thus expanding control and utility of the device. The spit is most useful if it can be rotated, preferably by the same motor as that used to rotate the basting container. It is important to note that the basting container is rotated around an axis generally parallel to the spit and that the basting container preferably is elongated, so that items disposed along a substantial width of the spit can be fully basted during roasting. Also, during such rotation, the container apertures resist clogging. The novel device thus provides improved uniform results in an economical, easily operated manner, regardless of the items roasted. Further advantages are set forth in the following detailed description and accompanying drawings.

DRAWINGS

FIG. 1 is a schematic perspective view of a first preferred embodiment of the improved roasting and basting device of the present invention, with portions broken away to illustrate certain internal features;

FIG. 3 is a schematic perspective view of a modified form of the basting container of the present invention;

DETAILED DESCRIPTION OF THE PREFERRED EMBODIMENT

FIG. 1

Figure 2:
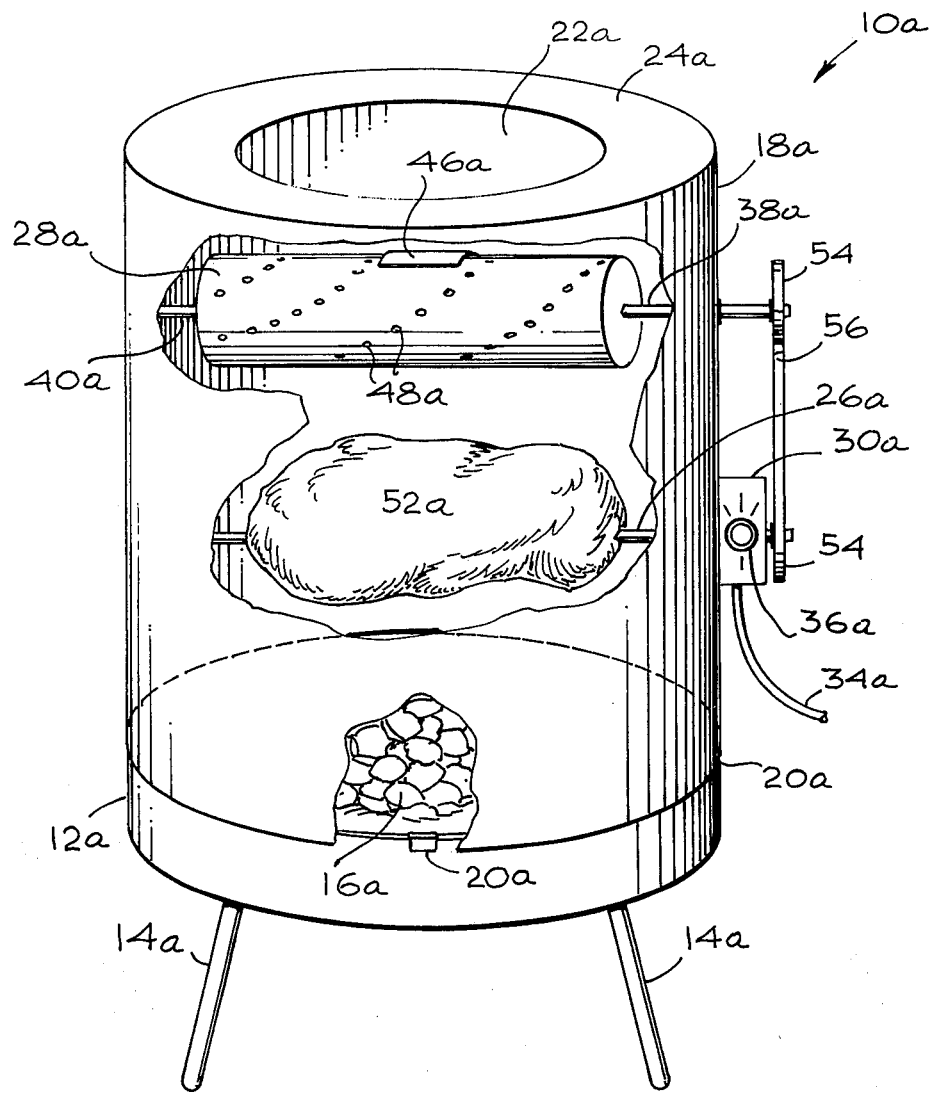
FIG. 2 is a schematic perspective view of a second preferred embodiment of the improved roasting and basting device of the present invention, with portions broken away to illustrate certain internal features.

A first preferred embodiment of the device of the present invention is schematically depicted in perspective view in FIG. 1. Thus, a food roasting and basting device 10 is shown, which includes a cup shaped, preferably cylindrical fire tray 12 supported by a plurality of depending legs 14 above the ground. Tray 12 may be of iron, steel or the like, and is adapted to receive and support fuel such as charcoal briquettes 16 shown in FIG. 1.

Device 10 may further include a preferably removable hood 18 disposed over and supported on tray 12, as by spaced brackets 20. Hood 18 may be generally cylindrical or the like. It is used to control smoke, which may rise up through vent 22 in the top 24 thereof, and to serve as a support for a roasting spit 26 disposed generally horizontally above tray 12 within hood 18, and a basting container 28 disposed generally horizontally above spit 26.

In the embodiment of FIG. 1, spit 26 and container 28 can be rotated by motors 30 and 32, respectively, electrically powered through electric cord line 34. Spit 26 is directly connected to motor 30, and its rotation is controlled by rheostat 36. Container 28 is connected to motor 32 through a support rod 38 extending from one end thereof, while a similar support rod 40 extends from the opposite end thereof and is rotatable secured in a collar 42 in the side of hood 18, as shown in FIG. 1. One end of spit 26 is similarly secured (not shown). The speed of rotation of container 28 is controlled by a rheostat 44 on motor 32 which is in turn electrically powered through line 34.

Hood 18 may be fabricated of any suitable material, such as aluminum, steel, iron, etc., as can container 28, spit 26, rods 38 and 40, and motors 30 and 32.

Preferably, container 28 is generally cylindrical and is disposed with its long axis parallel to spit 26, as shown in FIG. 1. Container 28 is hollow and access to its interior can be had through a removable closure 46. Liquid, powdery or granular basting material exits container 28 through a plurality of spaced apertures 48 extending through the side wall 50 thereof. The size and spacing of apertures 48 is such as to achieve a desired basting of an item or plurality of items 52 roasting on spit 26 (FIG. 1). Proper basting of items 52 is assured by rotation of spit 26 at a suitable speed, and rotation of container 28 also at a suitable speed. Rotation of container 28 assures that when the basting liquid, powder, etc. therein comprises two or more ingredients, they are kept properly mixed before and during delivery through apertures 48 to items 52. Moreover, apertures 48 do not tend to clog, since they are tilted through various angles during rotation of container 28. The basting liquid, if such is used, can be made up periodically from drippings from the roasting item 52 or from other sources. Accordingly, an improved inexpensive automatic food roasting and basting device is provided which is simple and highly efficient to build, operate, repair and maintain.

FIG. 2

A second preferred embodiment of the device of the present invention is schematically depicted in FIG. 2. In FIG. 2, components similar to those of FIG. 1, bear the same numerals as those of FIG. 1 but are succeeded by the letter "a", thus, a device 10a is shown which includes a fire tray 12a supported on legs 14a and in turn supporting briquettes 16a and hood 18a (secured as by brackets 20a). Hood 18a has smoke vent 20a in its top 24a and rotatably supports spits 26a and basting container 28a for rotation by a single motor 30a (for maximum economy) and a pair of pulley wheels 54 and a pulley belt 56 around wheels 54. Rod 38a runs from container 28a through hood 18a to one wheel 54, as shown in FIG. 2, while rod 40a rotatably supports the opposite end of container 28a in hood 18a. Motor 30a preferably is electrically powered through line 34a and is provided with a rheostat 36a to control the speed of rotation of both spit 26a and container 28a. It will be understood that the relative speed of rotation of spit 26 and container 28a can be regulated, as by varying the size of wheels 54, etc.

Container 28a is an elongated closed cylinder, as shown in FIG. 2, and includes a removable closure 46a and apertures 48a which are disposed in a spaced spiral pattern along the length of container 28a for maximum efficiency in delivering basting material to roasting food item 52a, regardless of its size and shape. Accordingly, device 10a provides essentially the same improved results as those obtained with device 10.

Figure 4:
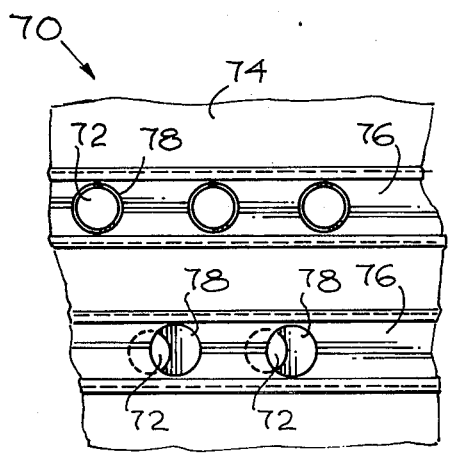
FIG. 4 is a schematic enlarged fragmentary front elevation of the basting container of FIG. 3.

FIGS. 3 and 4

In FIG. 3, there is schematically depicted a modified basting container 70 usable in the present device in place of container 28 and 28a. Container 70 may be any suitable size and shape, but preferably is an elongated hollow closed cylinder with a plurality of spaced apertures 72 extending between the hollow interior and the exterior thereof through sidewall 74 thereof. Elongated flat cover plates 76 which have holes 78 extending therethrough and matching apertures 72 in size and spacing, are slideably recessed in the outer face of side wall 74 over apertures 72. Pull tabs 80 on the ends of plates 76 permit plates 76 to be slid to positions where apertures 72 in a given row thereof are uncovered (middle row, FIG. 3), partially covered (top and bottom rows, FIG. 3) or fully covered, so as to finely control the dispensing of basting material from container 70 for improved basting.

FIG. 5

Figure 5:
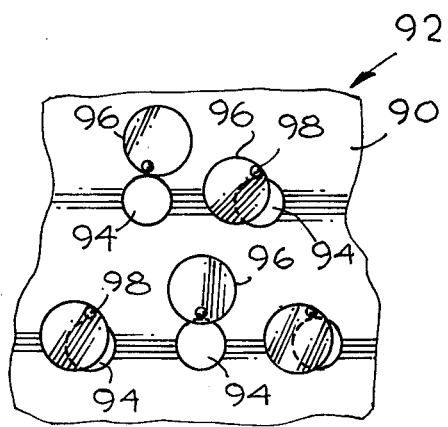
FIG. 5 is a schematic enlarged fragmentary front elevation of closure tabs for the apertures of the basting container in the present device; and, FIG. 6 is a schematic end view of a modified basting container of the present device, with an end plate thereof removed, thus illustrating the multiple compartments thereof.

Instead of the cover plates 76 which act upon a row of apertures 72 at one time, individual aperture size control can be achieved, as by the use of individual cover tabs, as shown schematically in FIG. 5. Thus, in FIG. 5, the sidewall 90 of a modified basting container 92 is shown, which container 92 can be, for example, similar in size and shape to container 70, 28 or 28a. However, container 92 includes a plurality of spaced apertures 94 extending through sidewall 90 and over which are disposed individual cover tabs 96 individually, pivotably secured, as at points 98, to the outer surface of sidewall 90. Thus, fine control of the dispensing of basting material from container 90 is maximized.

FIG. 6

A further modification in the basting container utilized in the present invention can be made, as shown schematically in end view in FIG. 6. Thus, a closed cylindrical basting container 110 is depicted with one end wall removed, the container having a sidewall 112 defining a hollow interior 114 subdivided into three compartments 116 by partitions 118. Preferably compartments 116 extend the length of container 110. End wall 120 is also shown. A different basting liquid or particulate solid or the like can be dispensed from each compartment 116 through apertures (not shown) extending through sidewall 112, so that the maximum flexibility possible is provided in the nature and type of basting ingredients utilized. For example, an aqueous acetic acid solution (vinegar) can be dispensed from one compartment 116, while a salt powder or ground pepper can be dispensed from another compartment 116. Thus, the ingredients separated in the several compartments 116 cannot interact before dispensing and thus their potency is preserved. Some solids such as large ground pepper granules are difficult to keep properly suspended in an aqueous solution so that they can be uniformly dispensed with the liquid only with difficulty. But with the present improvement, such difficulties are obviated because the liquid and particulate matter are separately dispensed from basting container 110. Accordingly, container 110 provides improved basting characteristics for the present device. Various other advantages are as set forth in the foregoing.

Various modifications, changes, alterations and additions can be made in the present device and its components. All such modifications, changes, alterations and additions as are within the scope of the appended claims form part of the present invention.

What is claimed and desired to be secured by Letters Patent is:

1. An improved automatic food roasting and basting device comprising, in combination:
   a. roasting means, including a fire box,
   b. a support member secured to and extending above said fire box,
   c. a roasting spit rotatably secured to said support member,
   d. a basting unit rotatably secured to said support member, above said spit,
   e. said basting unit and said roasting spit each having an axis of rotation lying in a common plane which is substantially perpendicular to the plane in which the fire box lies,
   f. connector means interconnecting the roasting spit and the basting unit to enable pre-selected, synchronized rotation of said roasting spit and said basting container, g. said basting unit comprising a tubular, hollow basting container, h. said container having a plurality of apertures extending continuously along the periphery thereof, i. power means for continuously rotating said container around an axis of rotation generally parallel to said spit, and j. a basting material disposed in said container, whereby said basting material is caused to pass through continuous apertures in the container and to be deposited continuously about the rotating item in the spit at a pre-determinable and variable rate of application thereon.

2. The improved device of claim 1 wherein said basting container is elongated and wherein means are disposed thereon for varying the size of said apertures.

3. The improved device of claim 2 wherein said aperture-varying means comprises a plurality of elongated holed cover plates slideably received on the exterior of said basting container over the said apertures, said holes of said cover plates matching the size and spacing of said apertures.

4. The improved device of claim 2 wherein said aperture-varying means comprise a plurality of tabs, each said tab pivotably connected to the exterior of said basting container adjacent a different one of said apertures, each said tab being dimensional to cover one of said apertures.

5. The improved device of claim 1 wherein said basting container is elongated and generally cylindrical and wherein said apertures thereof are disposed in a spiral pattern along the length thereof.

6. The improved device of claim 1 wherein said basting container has a plurality of partitions dividing the hollow interior thereof into separate compartments.

* * * * *